UNITED STATES PATENT OFFICE.

MARSHALL J. ALLEN, OF NEW YORK, N. Y., AND WILLIAM E. BRADLEY, OF FRANKFORT, KENTUCKY.

PROCESS OF MAKING WHISKY.

SPECIFICATION forming part of Letters Patent No. 229,653, dated July 6, 1880.

Application filed March 22, 1880.

*To all whom it may concern:*

Be it known that we, MARSHALL J. ALLEN, of the city, county, and State of New York, and WILLIAM E. BRADLEY, of Frankfort, in the county of Franklin and State of Kentucky, have invented a new and useful Improvement in the Process of Making Whisky, of which the following is a specification.

The object of our invention is to save and utilize, in the manufacture of whisky, the starch and sugar which are contained in the slop or spent beer.

Our invention consists in freeing the slop or spent beer of bran and other solid particles and employing the remaining liquid portion in place of water in the succeeding operations with the fresh grain; and by the term "operations" reference is made to mashing the grain, also to thinning down the mash and filling up the fermenting-vats.

In order to utilize the maximum quantity of slops or spent beer it is preferable to employ it in the three operations above specified; but it may be used in any one of such operations alone.

The object and necessity of thus separating the bran, chaff, and coarse particles of grain from the liquid portion of the slop or spent beer is this:

First. The starch and sugar in the slop or spent beer, which it is the object of this process to save, are nearly all retained in the liquid portion after separation. As only this liquid portion is used in this process, there is obtained by the separation of the bran, chaff, and coarse particles of grain a greatly-reduced bulk of material, thus making it possible to get into the fermenting-vats with the mash the maximum quantity of the starch and sugar contained in the slop or spent beer.

Second. It would be impossible to use the slop or spent beer with the bran, chaff, and coarse particles of grain in it in sufficient quantity to attain the results reached by this process—namely, the saving of the starch and sugar in the slop and their conversion into alcohol—for the reason that a few repetitions of the process would cause such an accumulation of bran, chaff, and coarse particles of grain in the fermenting-vats that the beer would become thick, and it would be impossible to work it. By this process, therefore, the starch and sugar in the slop or spent beer which were not converted into alcohol by the first fermentation are introduced into the fermenting-vats with the next mash, and thus are subjected to a second fermentation, producing a large percentage of alcohol which has heretofore been lost.

The grinding of the grain and the distillation of the beer are performed by the usual methods.

Having thus described our invention, we claim as new and desire to secure by Letters Patent—

In the manufacture of whisky, the process of saving the sugar and starch contained in a waste product and utilizing the same, which consists in freeing the slop from the bran, chaff, and coarse particles of grain and introducing the liquid thus obtained in place of water in the succeeding operations with fresh grain, substantially as set forth.

MARSHALL J. ALLEN.
WILLIAM E. BRADLEY.

Witnesses:
JAMES T. GRAHAM,
C. SEDGWICK.